US012665342B2

(12) United States Patent
Lim et al.

(10) Patent No.: US 12,665,342 B2
(45) Date of Patent: Jun. 23, 2026

(54) CONNECTOR COMPRISING MULTIPLE TERMINALS

(71) Applicant: Tyco Electronics AMP Korea Co., Ltd., Gyeongsan (KR)

(72) Inventors: Hee Jun Lim, Gyeongsan-Si (KR); Chang-Ho Lee, Gyeongsan-si (KR)

(73) Assignee: TYCO ELECTRONICS AMP KOREA CO., LTD., Gyeongsan-Si (KR)

( * ) Notice: Subject to any disclaimer, the term of this patent is extended or adjusted under 35 U.S.C. 154(b) by 321 days.

(21) Appl. No.: 18/517,589

(22) Filed: Nov. 22, 2023

(65) Prior Publication Data

US 2024/0170883 A1 May 23, 2024

(30) Foreign Application Priority Data

Nov. 23, 2022 (KR) ........................ 10-2022-0158295
Oct. 20, 2023 (KR) ........................ 10-2023-0141416

(51) Int. Cl.
*H01R 13/502* (2006.01)
*H01R 13/52* (2006.01)

(52) U.S. Cl.
CPC ....... *H01R 13/502* (2013.01); *H01R 13/5213* (2013.01)

(58) Field of Classification Search
CPC .......................... H01R 13/502; H01R 13/5213; H01R 13/112; H01R 13/53; H01R 13/506; H01R 13/631; H01R 13/6315; H01R 13/113; H01R 13/52; H01R 13/5202; H01R 13/516
See application file for complete search history.

(56) References Cited

U.S. PATENT DOCUMENTS

| | | | | |
|---|---|---|---|---|
| 4,423,917 | A | 1/1984 | Scheingold et al. | |
| 9,966,715 | B2 * | 5/2018 | Ishibashi | H01R 13/512 |
| 2012/0156909 | A1 | 6/2012 | Tyler | |
| 2014/0295708 | A1 * | 10/2014 | Omori | H01R 13/5208 439/626 |
| 2015/0079855 | A1 * | 3/2015 | Takemura | F16B 41/002 439/813 |
| 2015/0303613 | A1 | 10/2015 | Takeshita et al. | |
| 2018/0358748 | A1 * | 12/2018 | Yamanashi | H01R 24/62 |
| 2019/0379154 | A1 * | 12/2019 | Nishijima | H01R 13/748 |
| 2021/0044052 | A1 | 2/2021 | Takahashi et al. | |
| 2021/0175646 | A1 * | 6/2021 | Choi | H01R 9/2491 |
| 2023/0009685 | A1 * | 1/2023 | Cavallieri | H01R 13/506 |

FOREIGN PATENT DOCUMENTS

DE 102020110175 A1 10/2021

OTHER PUBLICATIONS

Extended European Search Report Mar. 19, 2024, corresponding to Application No. 23210815.9-1201, 10 pages.

* cited by examiner

*Primary Examiner* — Edwin A. Leon

(57) ABSTRACT

A connector includes an inner housing, multiple terminals, and an outer housing. The inner housing has an inner housing body, and an inner partition protruding from an inner side surface of the inner housing body. Multiple terminals are inserted into the inner housing and arranged in multiple terminal spaces defined by the inner partition. Each of the terminals includes a terminal body and a plurality of terminal arms extending from the terminal body. The outer housing is detachably connected to the inner housing and adapted to cover the multiple terminals.

23 Claims, 11 Drawing Sheets

CONNECTOR COMPRISING MULTIPLE TERMINALS

CROSS-REFERENCE TO RELATED APPLICATION

This application claims the benefit of Korean Patent Application No. 10-2022-0158295 filed on Nov. 23, 2022, and Korean Patent Application No. 10-2023-0141416 filed on Oct. 20, 2023, in the Korean Intellectual Property Office, the entire disclosures of which are incorporated herein by reference for all purposes.

FIELD OF THE INVENTION

The present disclosure relates to a connector having multiple terminals.

BACKGROUND

A connector is a type of component that selectively facilitates an electrical connection. For example, an automobile is provided with many electrical components such as electronic components or sensors. These electrical components are electrically connected to other electrical components or a power supply through connectors.

Insulation distance is an important criterion for preventing the risk of short circuits that may occur in electrical components. The insulation distance refers to the distance between two conductors. A clearance distance refers to the shortest distance across the air between two conductors. A creepage distance refers to the shortest distance along the surface of an insulating material between two conductors. For example, for a connector which includes multiple busbars mounted thereon, a sufficient creepage distance must be ensured between the multiple busbars.

SUMMARY

According to an embodiment of the present disclosure, a connector includes an inner housing, multiple terminals, and an outer housing. The inner housing has an inner housing body, and an inner partition protruding from an inner side surface of the inner housing body. Multiple terminals are inserted into the inner housing and arranged in multiple terminal spaces defined by the inner partition. Rach of the terminals includes a terminal body and a plurality of terminal arms extending from the terminal body. The outer housing is detachably connected to the inner housing and adapted to cover the multiple terminals.

BRIEF DESCRIPTION OF THE DRAWINGS

The invention will now be described by way of example with reference to the accompanying Figures, of which.

DETAILED DESCRIPTION OF THE EMBODIMENTS

Figure 1:
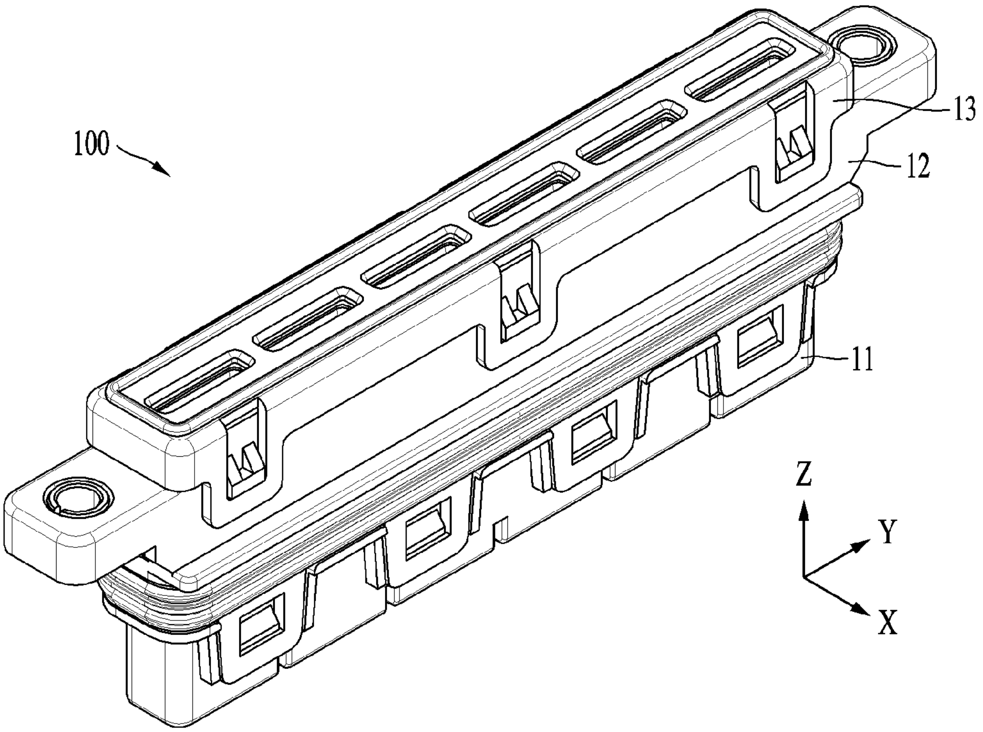
FIG. 1 is a perspective view of a connector according to an embodiment.

Hereinafter, embodiments are described in detail with reference to the accompanying drawings. The following description describes one of several aspects of the embodiments, and the following description forms part of the detailed description of the embodiments. In the description of an embodiment, any detailed description of a well-known function or configuration is not included to clearly convey the gist of the present disclosure.

However, various alterations and modifications may be made to the embodiments. Thus, the embodiments are not meant to be limited by the descriptions of the present disclosure. The embodiments should be understood to include all changes, equivalents, and replacements within the idea and the technical scope of the disclosure.

In addition, the terms or words used to describe the present disclosure and claims should not be construed in a conventional or dictionary meaning, and based on a principle that the inventor may properly define the concept of terms in order to best describe their invention, the terms or words should be construed as having meanings and concepts consistent with the technical idea of the disclosure according to an embodiment.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the embodiments belong. Terms defined in dictionaries generally used should be construed as having meanings matching contextual meanings in the related art and are not to be construed as having an ideal or excessively formal meaning unless otherwise defined herein.

When describing the embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure.

These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The constituent element, which has the same common function as the constituent element included in any one embodiment, will be described by using the same name in other embodiments. Unless disclosed to the contrary, the configuration disclosed in any one embodiment may be applied to other embodiments, and the specific description of the repeated configuration will be omitted.

Figure 2:
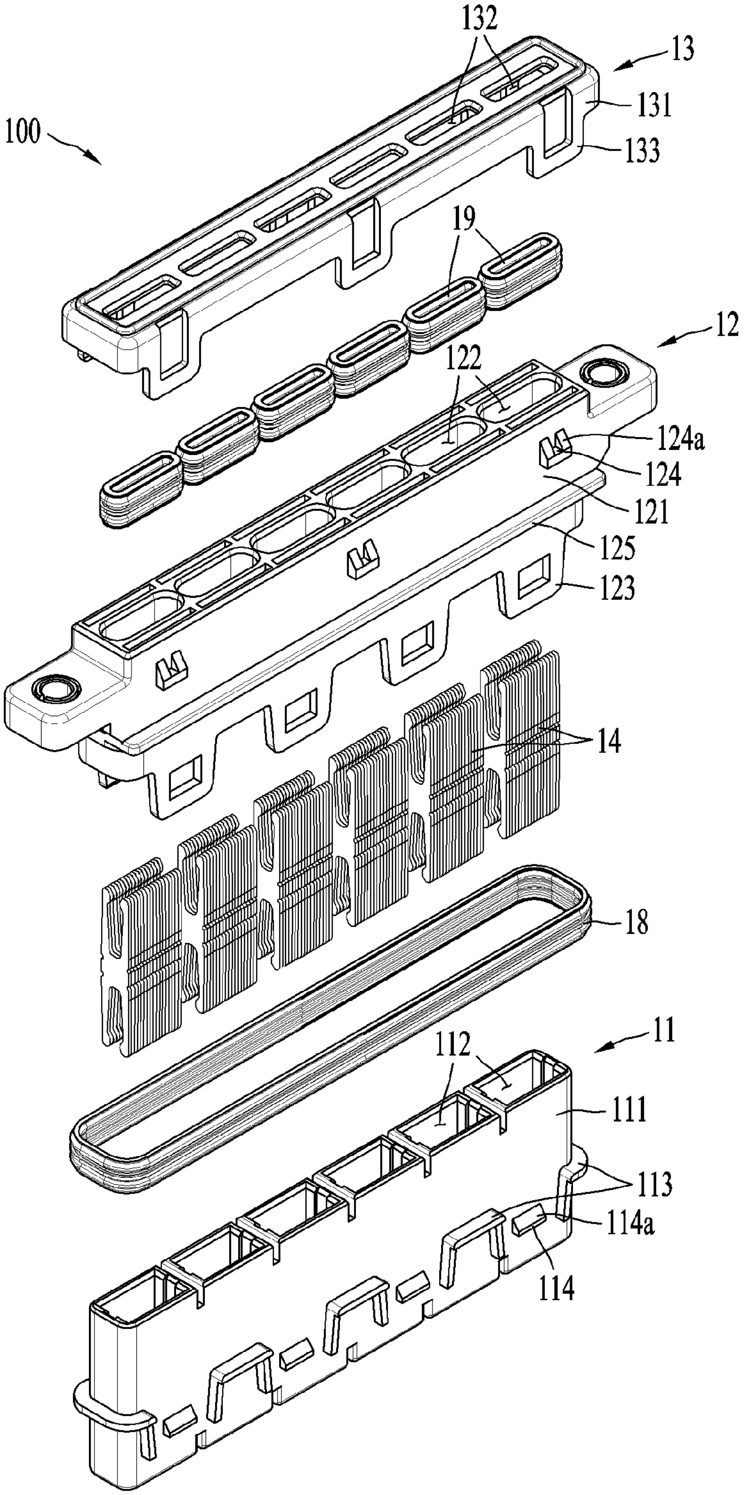
FIG. 2 is an exploded perspective view of a connector according to an embodiment.
Figure 3:
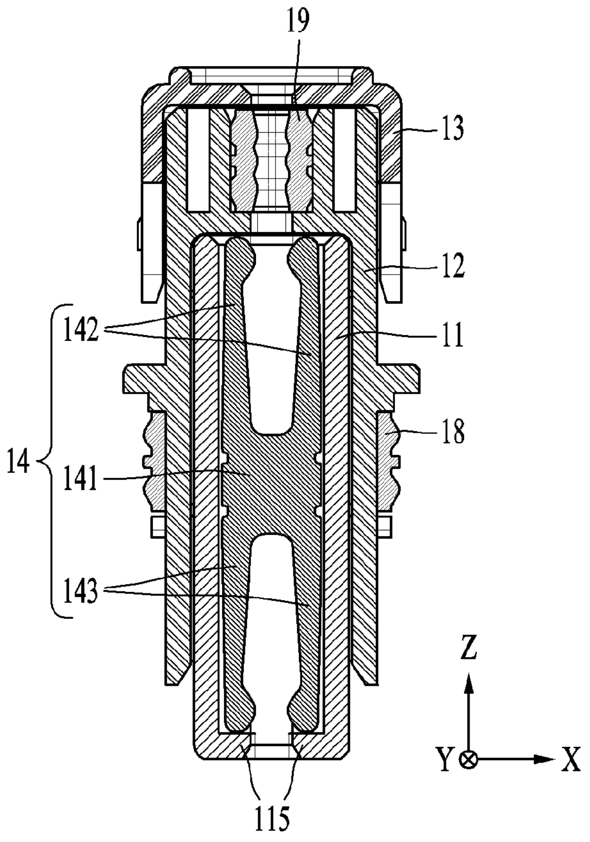
FIG. 3 is a cross-sectional view of a connector according to an embodiment, cut along an XZ plane.

FIG. 1 is a perspective view of a connector according to an embodiment. FIG. 2 is an exploded perspective view of the connector according to an embodiment. FIG. 3 is a cross-sectional view of the connector according to an embodiment, cut along an XZ plane. Referring to FIGS. 1-3, a connector 100 including multiple terminals (hereinafter, referred to as the connector 100) may electrically connect two different electronic devices. One electronic device may be connected to an upper side of the connector 100 through a busbar. The other electronic device (not shown) may be connected to a lower side of the connector 100 through a busbar. The connector 100 may include an inner housing 11, an outer housing 12, a cover 13, terminals 14, a housing seal 18, and a cover seal 19.

The inner housing 11 may accommodate terminals 14. The inner housing 11 may have multiple spaces for accommodating the terminals 14. The inner housing 11 may include an inner housing body 111, multiple inner housing openings 112, an inner housing rib 113, and an inner housing protrusion 114. The inner housing body 111 may form the exterior of the inner housing 11. The inner housing body 111 may have an opening or hollow therein. The hollow may be partitioned into multiple hollows or spaces. The hollows may accommodate respective ones of the multiple terminals 14.

The multiple inner housing openings 112 may be formed in the inner housing body 111. The multiple inner housing openings 112 may be arranged side by side in the Y-axis direction. The inner housing openings 112 may be provided on one side of the inner housing body 111 and may be formed through the inner housing body 111 in the Z-axis direction.

The inner housing rib 113 may protrude outward from the inner housing body 111. The inner housing rib 113 may support a lower side surface of the housing seal 18. In this description, it should be understood that the upper side may be the +Z direction, and the lower side may be the −Z direction.

The inner housing protrusion 114 may protrude outward from the inner housing body 111. The inner housing protrusion 114 may be provided at a position spaced apart from the inner housing rib 113. The inner housing protrusion 114 may support the outer housing 12 in a state in which the outer housing 12 is coupled to the inner housing 11. The inner housing protrusion 114 may assist in preventing the outer housing 12 from being unintentionally separated from the inner housing 11. The inner housing protrusion 114 may have a shape whose height gradually decreases upward. The inner housing protrusion 114 may have an inclined surface **114*a* that facilitates the coupling of the outer housing 12 but hinders the separation of the outer housing 12**.

The outer housing 12 may be detachably coupled to the inner housing 11. The outer housing 12 may move downward from an upper side of the inner housing 11 and be coupled to the inner housing 11, thereby preventing the terminal 14 from being separated in an upward direction of the inner housing 11. The outer housing 12 may include an outer housing body 121, multiple outer housing openings 122, an outer housing arm 123, an outer housing protrusion 124, and an outer housing rib 125. The outer housing body 121 may surround at least a portion of the outer housing 12. The outer housing body 121 may protect the outer housing 12 by surrounding the outer housing 12.

The multiple outer housing openings 122 may be formed in the outer housing body 121. The multiple outer housing openings 122 may be arranged side by side in the Y-axis direction. The outer housing openings 122 may be provided on one side of the outer housing body 121 and may be formed through the outer housing body 121 in the Z-axis direction. The outer housing openings 122 may expose openings in the outer housing body 121 to the outside. The outer housing openings 122 may communicate with the inner housing openings 112. However, the outer housing openings 122 may be formed in a size that prevents the terminal 14 from being separated from the inner housing 11. Specifically, the outer housing openings 122 may be formed in such a shape that both outer ends of the terminal 14 may overlap the outer housing 111 so as to prevent the terminal 14 from being separated from the inner housing 11, irrespective of the number of terminals 14 provided in the inner housing 11.

The outer housing arm 123 may extend from the outer housing body 121. The outer housing arm 123 may extend downward from the outer housing body 121. The outer housing arm 123 may be caught or captured by the inner housing protrusion 114.

The outer housing protrusion 124 may protrude outward from the outer housing body 121. The outer housing protrusion 124 may support the cover 13 in a state in which the cover 13 is coupled to the outer housing 12. The outer housing protrusion 124 may assist in preventing the cover 13 from being unintentionally separated from the outer housing 12. The outer housing protrusion 124 may have a shape whose height gradually decreases upward. The outer housing protrusion 124 may have an inclined surface **124*a* that facilitates the coupling of the cover 13 but hinders the separation of the cover 13. The outer housing rib 125 may protrude outward from the outer housing body 121. The outer housing rib 125 may support an upper side surface of the housing seal 18**.

The cover 13 may be detachably connected to the outer housing 12. The cover 13 may include a cover body 131, multiple cover holes 132 formed through the cover body 131, and a cover arm 133 provided to extend from the cover body 131 and be caught by the outer housing protrusion 124. The multiple cover holes 132 may communicate with the multiple outer housing openings 122.

The terminals 14 may be provided inside the inner housing 11. The inner housing 11 may have a space partitioned into multiple spaces to accommodate the multiple terminals 14. For example, the inner housing 11 is shown as having six partitioned spaces. However, the number of partitioned spaces of the inner housing 11 is not limited thereto. The multiple terminals 14 may be provided in the respective partitioned spaces. The terminal 14 may include a terminal body 141, a first terminal arm 142 extending upward from the terminal body 141, and a second terminal arm 143 extending downward from the terminal body 141.

The housing seal 18 may surround the inner housing 11. The housing seal 18 may implement waterproofing around an outer side surface of the inner housing 11. The cover seal 19 may be embodied as multiple cover seals 19. The multiple cover seals 19 may be provided respectively in the outer housing openings 122. The cover seals 19 may implement waterproofing around the outer housing openings 122.

Figure 4:
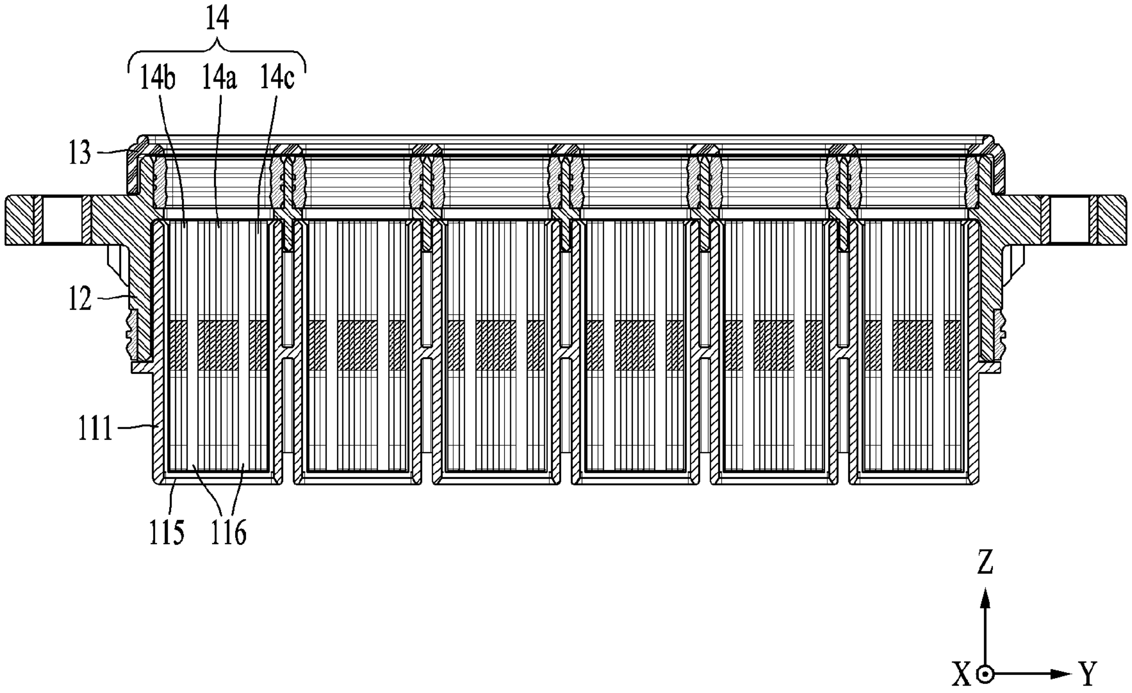
FIG. 4 is a cross-sectional view of a connector according to an embodiment, cut along a YZ plane.
Figure 5:
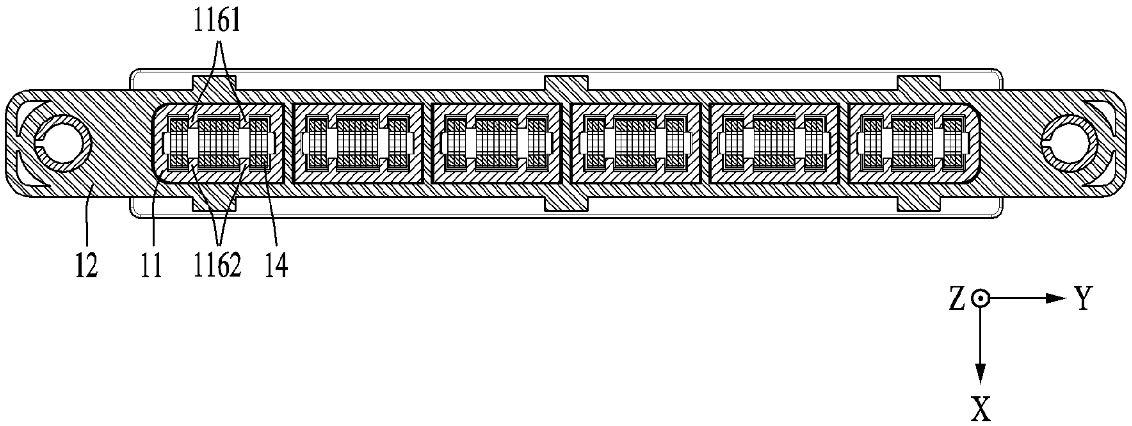
FIG. 5 is a cross-sectional view of a connector according to an embodiment, cut along an XY plane.

FIG. 4 is a cross-sectional view of a connector according to an embodiment, cut along a YZ plane. FIG. 5 is a cross-sectional view of the connector according to an embodiment, cut along an XY plane. Referring to FIGS. 4 and 5, the inner housing 11, the outer housing 12, and the cover 13 may be connected to each other. The inner housing 11 may include the inner housing body 111, an inner housing support 115 protruding from a lower end portion of the inner housing body 111, and an inner partition 116. The inner partition 116 protrudes from an inner side surface of the inner housing body 111 and partitioning the space for accommodating the multiple terminals 14 into multiple spaces.

The inner housing support 115 may support the terminals 14. The inner housing support 115 may form an opening through which an external busbar may be inserted. Through the opening formed by the inner housing support 115, the external busbar may move in the +Z direction and be inserted into the inner housing body 111. The busbar may be inserted into the multiple terminals 14. The inner housing support 115 may assist in preventing the terminals 14 from being unintentionally separated downward.

The inner partition 116 may protrude from the inner side surface of the inner housing body 111 in the X-axis direction. At least a portion of the inner partition 116 may overlap or separate the multiple terminals 14 in a direction parallel to the direction in which the multiple terminals 14 are stacked. The direction in which the multiple terminals 14 are stacked may be the Y-axis direction. The inner partition 116 may support at least a portion of the multiple terminals 14. The inner partition 116 may include a first inner partition 1161 protruding from a first inner side surface of the inner housing body 111 and a second inner partition 1162 protruding from a second inner side surface of the inner housing body 111. The first inner partition 1161 and the second inner partition 1162 may face each other. The first inner partition 1161 and the second inner partition 1162 may be provided as multiple first inner partitions 1161 and multiple second inner partitions 1162, respectively. In the exemplary embodiment, there are two first inner partitions 1161 and two second inner partitions 1162, but the numbers thereof are not limited thereto.

The multiple terminals 14 may be divided into multiple terminals by the inner partition 116. For example, the multiple terminals 14 may include multiple first terminals 14*a* provided between a pair of inner partitions 116, multiple second terminals 14*b* provided on an opposite side of the multiple first terminals 14*a* with one of the inner partitions 116 interposed therebetween, and multiple third terminals 14*c* provided on an opposite side of the multiple first terminals 14*a* with the other one of the inner partitions 116 interposed therebetween.

When a connector is connected to a low-voltage (e.g., 160 kW) busbar, the connector may accommodate the multiple first terminals 14*a* only. Even if a relatively small number of terminals 14 are provided, the terminals may be suitable for the low-voltage busbar. When a connector is connected to a high-voltage (e.g., 200 kW) busbar, it may accommodate not only the multiple first terminals 14*a* but also the multiple second terminals 14*b* and/or third terminals 14*c*. A relatively large number of terminals 14 may be suitable for the high-voltage busbar. The connector has the inner partition 116 and may thus stably support multiple terminals 14 even when the number of terminals 14 accommodated in the inner housing 11 varies. Further, the terminals 14 may be provided in the inner housing 11 so as to move in a direction in which multiple terminals are stacked, whereby terminals 14 may be added to or removed from the inner housing 11 conveniently according to the capacity of the busbar.

Figure 6:
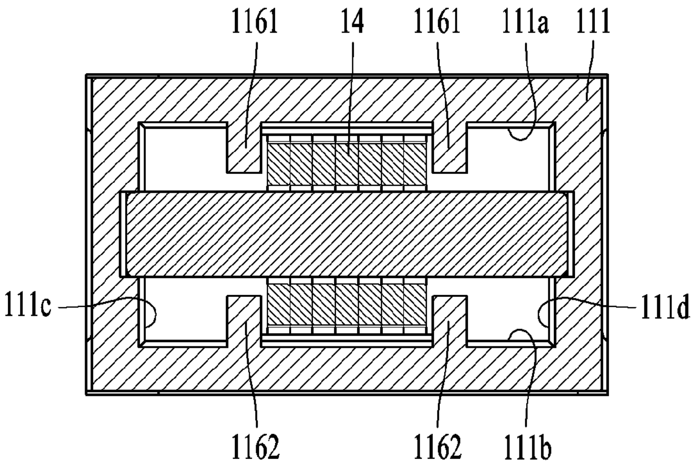
FIG. 6 is a schematically enlarged cross-sectional view of a portion of a connector according to an embodiment.
Figure 7:
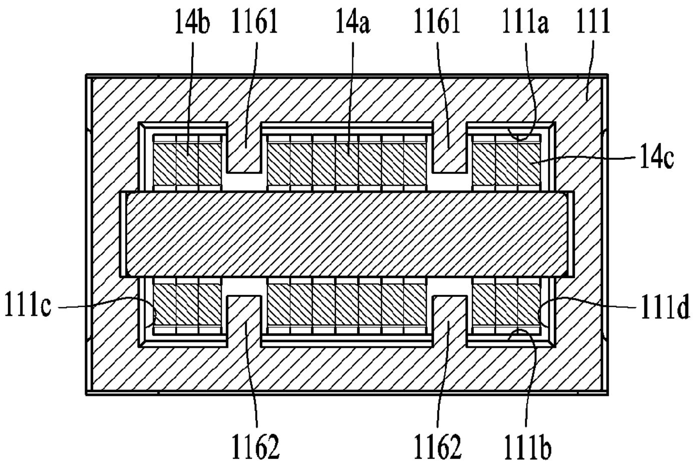
FIG. 7 is a schematically enlarged cross-sectional view of a portion of a connector according to an embodiment.

FIG. 6 is a schematically enlarged cross-sectional view of a portion of a connector according to an embodiment. FIG. 7 is a schematically enlarged cross-sectional view of a portion of a connector according to an embodiment. Referring to FIGS. 6 and 7, the inner housing body 111 may include a first inner side surface 111*a* and a second inner side surface 111*b* provided in directions to face each other. The inner housing body 111 may include a third inner side surface 111*c* and a fourth inner side surface 111*d* provided in directions to face each other. The inner partitions 1161 and 1162 may include the first inner partition 1161 protruding in a direction from the first inner side surface 111*a* toward the second inner side surface 111*b* and the second inner partition 1162 protruding in a direction from the second inner side surface 111*b* toward the first inner side surface 111*a*.

The multiple terminals 14 may be divided into multiple terminals by the inner partitions 1161 and 1162. For example, the multiple terminals 14 may include the multiple first terminals 14*a* provided between a pair of inner partitions 1161 and 1162, the multiple second terminals 14*b* provided on an opposite side of the multiple first terminals 14*a* with one of the inner partitions 1161 and 1162 interposed therebetween, and the multiple third terminals 14*c* provided on an opposite side of the multiple first terminals 14*a* with the other one of the inner partitions 1161 and 1162 interposed therebetween.

The multiple first terminals 14*a* may be supported by the pair of inner partitions 1161 and 1162. The multiple first terminals 14*a* may be tilted to some extent, but the tilt angle may be limited by the pair of inner partitions 1161 and 1162. The multiple second terminals 14*b* may be supported by one of the pair of inner partitions 1161 and 1162 and the third inner side surface 111*c*. The multiple second terminals 14*b* may be tilted to some extent, but the tilt angle may be limited by one of the inner partitions 1161 and 1162 and the third inner side surface 111*c*. The multiple third terminals 14*c* may be supported by the other one of the pair of inner partitions 1161 and 1162 and the fourth inner side surface 111*d*. The multiple third terminals 14*c* may be tilted to a degree, but the tilt angle may be limited by the other one of the inner partitions 1161 and 1162 and the fourth inner side surface 111*d*.

Figure 8:
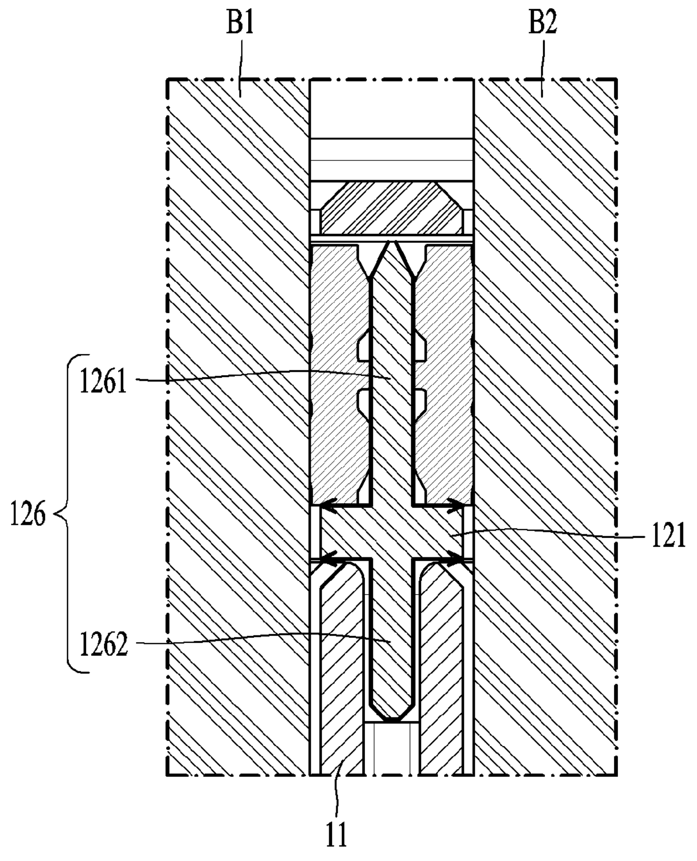
FIG. 8 is a cross-sectional view of a connector according to an embodiment, illustrating a creepage distance between two connected busbars.
Figure 9:
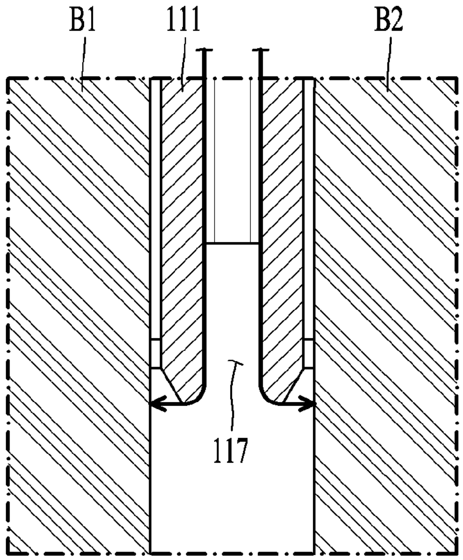
FIG. 9 is a cross-sectional view of a connector according to an embodiment, illustrating a creepage distance between two connected busbars.

FIG. 8 is a cross-sectional view of a connector according to an embodiment, illustrating a creepage distance between two connected busbars. FIG. 9 is a cross-sectional view of a connector according to an embodiment, illustrating a creepage distance between two connected busbars. Referring to FIGS. 8 and 9, an outer housing may include the outer housing body 121 and an outer partition 126. The outer partition 126 may protrude from the outer housing body 121 and may be provided between two adjacent busbars B1 and B2 among multiple busbars. The outer partition 126 may increase the creepage distance between the two adjacent busbars B1 and B2 (indicated by arrows).

The outer partition 126 may be embodied as multiple outer partitions 126. The multiple outer partitions 126 may include a first outer partition 1261 protruding in a direction away from the inner housing 11 and a second outer partition 1262 protruding in a direction in which the second outer partition 1262 is inserted into the inner housing 11. At least a portion of the second outer partition 1262 may be inserted into the inner housing 11.

An inner housing may include an inner housing groove 117 that is recessed in the inner housing body 111 and provided between two adjacent busbars B1 and B2 among multiple busbars. The inner housing groove 117 may increase the creepage distance between the two adjacent busbars B1 and B2 (see the arrows). The inner housing groove 117 may be formed in at least one of the upper end portion and the lower end portion of the inner housing body 111. For example, the inner housing groove 117 may be formed at the same time in the upper end portion and the lower end portion of the inner housing body 111. For example, the inner housing groove provided in the upper end portion of the inner housing body 111 may vertically overlap the inner housing groove provided in the lower end portion of the inner housing body 111. A second outer partition 1252 may be inserted into the inner housing groove provided in the upper end portion of the inner housing body 111.

Figure 10:
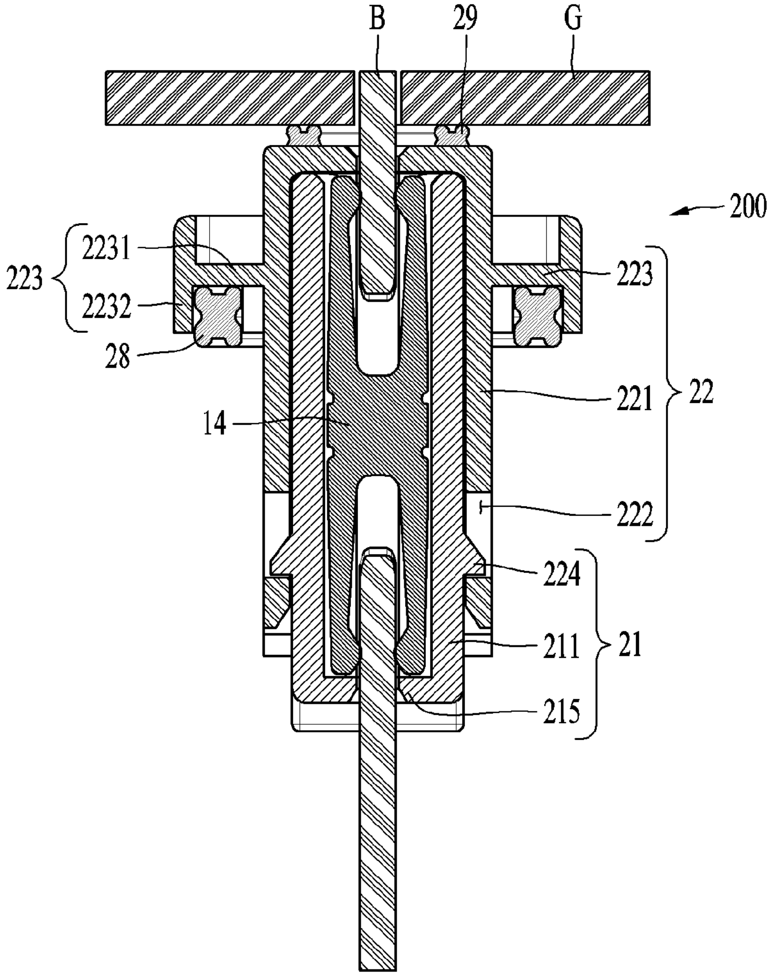
FIG. 10 is a cross-sectional view of a connector according to an embodiment.

FIG. 10 is a cross-sectional view of a connector according to an embodiment. Referring to FIG. 10, a connector 200 may be connected to a busbar B. The connector 200 may not have a cover. The connector 200 may include an inner housing 21, an outer housing 22, a terminal 24, a first seal 28, and a second seal 29.

The inner housing 21 may include an inner housing body 211, an inner housing protrusion 224, and an inner housing support 215. The inner housing protrusion 224 may protrude from the inner housing body 211. The inner housing support 215 may support the terminal 24. The inner housing 21 may have an inner housing partition (see FIG. 6) to partition a space for accommodating the terminal 24 into multiple spaces.

The outer housing 22 may include an outer housing body 221, an outer housing hole 222, and an outer housing base 223. The outer housing hole 222 may accommodate the inner housing protrusion 224. The outer housing base 223 may include a base plate 2231 extending from the outer housing body 221 and a base head 2232 extending vertically from the base plate 2231. The outer housing base 223 may support the first seal 28.

The terminal 24 may be accommodated in the inner housing 21. The first seal 28 may be disposed on the outer housing base 223. The second seal 29 may be disposed on the outer housing body 221. The second seal 29 may be in close contact with the ground G.

Figure 11:
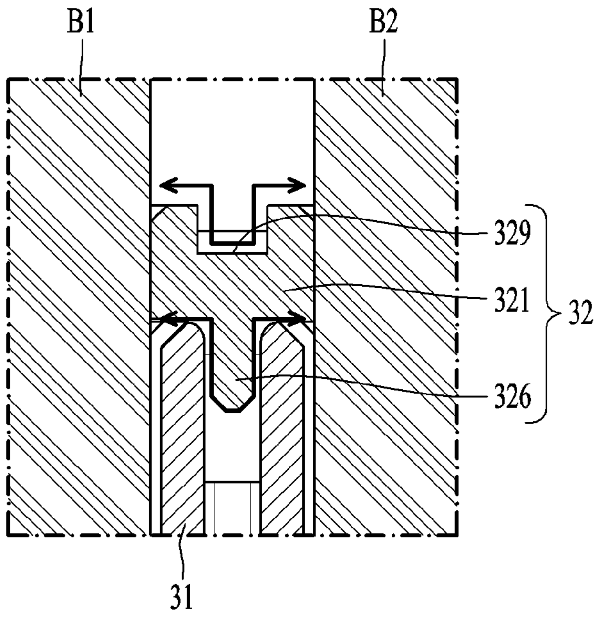
FIG. 11 is a cross-sectional view of a connector according to an embodiment, illustrating a creepage distance between two connected busbars.

FIG. 11 is a cross-sectional view of a connector according to an embodiment, illustrating a creepage distance between two connected busbars. Referring to FIG. 11, an outer housing 32 may include an outer housing body 321, an outer partition 326, and an outer housing groove 329. The outer partition 326 may protrude from the outer housing body 321 and be provided between two adjacent busbars B1 and B2 among multiple busbars. The outer partition 326 may be inserted into an inner housing 31. For example, the outer partition 326 may protrude downward from the lower surface of the outer housing body 321. The outer groove 329 may be recessed in the outer housing body 321. For example, the outer groove 329 may be formed in the upper surface of the outer housing body 321 and recessed downward from the upper surface. The outer partition 326 and the outer groove 329 may increase the creepage distance between the two adjacent busbars B1 and B2 (indicated by arrows).

Embodiments have been described above with reference to specific matters such as specific components and limited embodiments and with reference to drawings, but these are provided to facilitate overall understanding. Also, the present disclosure is not limited to the above-described embodiments, and various modifications and variations are possible from these descriptions by those skilled in the art to which the present disclosure pertains. Accordingly, the scope of the present disclosure is defined not by the detailed description, but by the claims and their equivalents, and all variations within the scope of the claims and their equivalents are to be construed as being included in the disclosure.

What is claimed is:

1. A connector, comprising:
an inner housing, including:
an inner housing body; and
an inner partition protruding from an inner side surface of the inner housing body;
multiple terminals inserted into the inner housing and arranged in multiple terminal spaces defined by the inner partition; and
an outer housing detachably connected to the inner housing and adapted to cover the multiple terminals, the outer housing includes an outer housing body and an outer partition protruding from the outer housing body and arranged between two adjacent busbars of multiple busbars received in the multiple terminal spaces and mating with the multiple terminals.

2. The connector of claim 1, wherein at least a portion of the inner partition separates the multiple terminals in a direction parallel to a row in which the multiple terminals are arranged.

3. The connector of claim 1, wherein the inner partition supports at least a portion of the multiple terminals.

4. The connector of claim 1, wherein portions of the multiple terminals are provided on opposite sides based on the inner partition.

5. The connector of claim 1, wherein the inner housing body includes a first inner side surface and a second inner side surface opposing the first inner side surface.

6. The connector of claim 5, wherein the inner partition includes a first inner partition protruding in a direction from the first inner side surface toward the second inner side surface, and a second inner partition protruding in a direction from the second inner side surface toward the first inner side surface.

7. The connector of claim 6, wherein the first inner partition and the second inner partition define multiple first inner partitions and multiple second inner partitions, respectively, in a direction of a row in which the multiple terminals are arranged.

8. The connector of claim 1, wherein the inner housing further comprises multiple inner housing openings for accommodating multiple busbars.

9. The connector of claim 1, wherein the outer partition defines multiple outer partitions, each including a first outer partition protruding in a direction away from the inner housing and a second outer partition protruding in a direction in which the second outer partition is inserted into the inner housing.

10. The connector of claim 9, wherein each of the multiple terminals is formed such that outer end portions thereof overlap the outer housing body.

11. The connector of claim 1, wherein each of the terminals including a terminal body and a plurality of terminal arms extending from the terminal body.

12. A connector, comprising:

an inner housing having an inner partition defining a plurality of terminal spaces;

an outer housing detachably connected to the inner housing and adapted to at least partially cover the plurality of terminal spaces, the outer housing includes an outer housing body and an outer partition protruding from the outer housing body and arranged between two adjacent busbars of multiple busbars received in the plurality of terminal spaces; and a cover detachably connected to the outer housing.

13. The connector of claim 12, further comprising:

a cover seal arranged between the outer housing and the cover; and a housing seal arranged between the inner housing and the outer housing.

14. The connector of claim 12, wherein at least a portion of the inner partition separates the terminal spaces in a direction parallel to a row in which the terminal spaces are arranged.

15. The connector of claim 12, wherein the inner housing includes a first inner side surface and a second inner side surface opposing the first inner side surface.

16. The connector of claim 15, wherein the inner partition includes:

a first inner partition protruding in a direction from the first inner side surface toward the second inner side surface; and a second inner partition protruding in a direction from the second inner side surface toward the first inner side surface.

17. The connector of claim 16, wherein the first inner partition and the second inner partition define multiple first inner partitions and multiple second inner partitions, respectively, in a direction of a row in which the terminal spaces are arranged.

18. The connector of claim 12, wherein the inner housing further includes multiple inner housing openings for accommodating multiple busbars.

19. The connector of claim 8, wherein each inner housing opening is separate from an adjacent inner housing opening.

20. The connector of claim 8, wherein the inner housing includes multiple inner partitions, at least one inner partition is positioned within each inner housing opening.

21. The connector of claim 1, wherein the inner housing includes an inner housing groove recessed in the inner housing body and arranged between the two adjacent busbars, the inner housing groove increases a creepage distance between the two adjacent busbars.

22. The connector of claim 13, wherein the outer housing has multiple outer housing openings and the connector comprises multiple cover seals, each cover seal implements waterproofing around one outer housing opening.

23. The connector of claim 1, wherein the outer housing has an outer groove recessed in the outer housing body, the outer groove increases a creepage distance between the two adjacent busbars.

* * * * *